(12) United States Patent
Chang et al.

(10) Patent No.: US 8,576,161 B2
(45) Date of Patent: Nov. 5, 2013

(54) DRIVING AN OLED DISPLAY STRUCTURE INTEGRATED WITH A TOUCH SENSOR CONFIGURATION

(75) Inventors: Shih Chang Chang, Cupertino, CA (US); Steven Porter Hotelling, San Jose, CA (US); Brian Lynch, Portoloa Valley, CA (US)

(73) Assignee: Apple Inc., Cupertino, CA (US)

( * ) Notice: Subject to any disclaimer, the term of this patent is extended or adjusted under 35 U.S.C. 154(b) by 1036 days.

(21) Appl. No.: 12/487,616

(22) Filed: Jun. 18, 2009

(65) Prior Publication Data
US 2010/0321305 A1 Dec. 23, 2010

(51) Int. Cl.
G09G 3/36 (2006.01)
G06F 3/045 (2006.01)
G06F 3/044 (2006.01)

(52) U.S. Cl.
USPC .......................... 345/104; 345/174; 178/18.06

(58) Field of Classification Search
USPC ................................. 345/104, 173–178, 207; 178/18.01–20.04
See application file for complete search history.

(56) References Cited

U.S. PATENT DOCUMENTS

| | | | |
|---|---|---|---|
| 4,794,208 A * | 12/1988 | Watson | 178/19.06 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,124,848 A * | 9/2000 | Ballare et al. | 345/179 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,436,114 B2 | 10/2008 | Wang et al. | |
| 7,663,607 B2 | 2/2010 | Hotelling et al. | |
| 8,479,122 B2 | 7/2013 | Hotelling et al. | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2007/0018969 A1 | 1/2007 | Chen et al. | |
| 2007/0229465 A1 * | 10/2007 | Sakai et al. | 345/173 |
| 2008/0062147 A1 | 3/2008 | Hotelling et al. | |
| 2008/0165139 A1 | 7/2008 | Hotelling et al. | |
| 2009/0091551 A1 | 4/2009 | Hotelling et al. | |
| 2009/0167699 A1 * | 7/2009 | Rosenblatt et al. | 345/173 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Han, C-W. et al. (2008). "3.2: *Distinguished Paper*: 15-inch XGA Dual-plate OLED Display (DOD) Based on Amorphous Silicon (a-Si) TFT Backplane," *SID 08 Digest* 5-8.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Bipin Shalwala
*Assistant Examiner* — Steven Holton
(74) *Attorney, Agent, or Firm* — Morrison & Foerster LLP

(57) ABSTRACT

Briefly, in accordance with one embodiment, a method is provided of driving an OLED display structure integrated with a touch sensor configuration.

19 Claims, 11 Drawing Sheets

(56) References Cited

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DRIVING AN OLED DISPLAY STRUCTURE INTEGRATED WITH A TOUCH SENSOR CONFIGURATION

This disclosure relates generally to driving an OLED display structure that is integrated with a touch sensor configuration.

BACKGROUND

Many types of input devices are available for performing operations in a computing system, such as buttons or keys, mice, trackballs, joysticks, touch sensor panels, touch screens, or the like. Touch screens may come in a variety of forms, such as a touch sensor panel, which may include a clear or transparent panel with a touch-sensitive surface and a display device, which may include a display positioned partially or fully behind the touch panel so that the touch-sensitive surface may cover at least a portion of the viewable area of the display device. Touch screens generally allow a user to perform various functions by touching (e.g., physical contact) the touch sensor panel or by near-field proximity to it. In general, a computing system may register the touch event and may be capable of performing one or more actions based at least in part on registration of the touch event.

Touch screens, or devices that may incorporate, or be compatible with, touch screen technology, seem to be increasingly popular. Their popularity with consumers may be partly attributable to their relative ease or versatility of operation, as well as their declining price. In addition, touch screens may also be increasingly popular due, in part, to their generally decreasing overall size, their reliability, or their robustness. A corollary to these characteristics may be that, from a manufacturer's perspective, costs associated with producing devices including touch screens, or producing devices including touch screens with characteristics which are believed to be desirable for consumers, have decreased or become less onerous. Accordingly, there generally is a desire to continue to develop approaches or techniques believed to be desirable for consumers or end-users in terms of cost, performance or a combination thereof.

DETAILED DESCRIPTION

In the following description of embodiments, reference is made to the accompanying drawings which form a part hereof, and in which it is shown by way of illustration specific embodiments of claimed subject matter. It is to be understood that other embodiments may be used, for example, changes or alterations, such as structural changes, may be made. All embodiments, changes or alterations are not departures from scope with respect to intended claimed subject matter.

This disclosure relates generally to a passive touch actuated sensor configuration embodiment integrated with or in direct physical contact with an organic light emitting diode (OLED) structure embodiment in a module or integrated circuit (IC) embodiment. In this context, a touch actuated sensor configuration may refer to a configuration of touch sensors, including a surface, in which touch sensors of the configuration are responsive to direct physical contact with (e.g., touching) or close proximity to the surface of the configuration or a portion thereof. It is noted also that the terms touch actuated sensor configuration, touch activated sensor configuration, touch sensor panel and touch sensor configuration may be used interchangeably throughout this specification. Likewise, in this context, a passive touch actuated sensor configuration may refer to a touch actuated sensor configuration in which it is not needed for additional externally produced electromotive energy to be supplied to the overall touch sensor configuration or system for touch sensors of the configuration to be responsive.

In an example embodiment, a touch actuated sensor configuration embodiment may include an array of touch sensors integrated with an array of OLED pixels in a module or in an integrated circuit (IC). Here, the detection of a touch event by one or more touch sensors may be sensed by sense circuitry and processed or otherwise interpreted. The interpreted touch data may result in a processor or other circuit electrically activating pixels of the array to change the display, as described in more detail below. OLED structures may provide potential advantages over possible alternative display technologies, depending at least in part on the particular application. For example, OLED structures typically do not employ light valves or similar technology.

Figure 1:
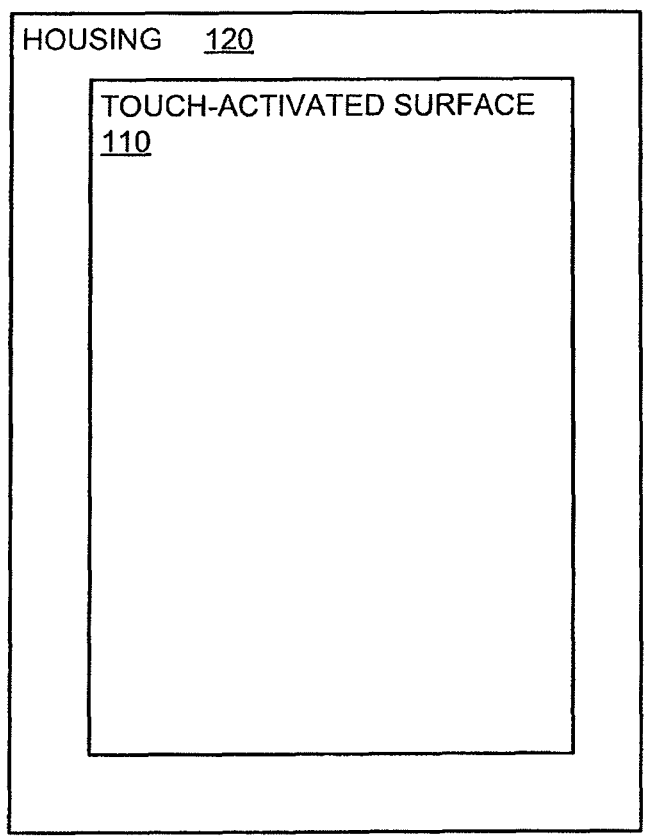
FIG. 1 is a plan view illustrating an example of a hand held device embodiment.

Turning to the figures, FIG. 1 is a plan view illustrating an example of a hand held device embodiment 100. It is noted that claimed subject matter is not limited in scope to a hand held device. This is simply one example embodiment. Rather, claimed subject matter may be employed in connection with any one of a host of possible devices, including a computing system, a mobile phone, a personal digital assistant, or a set top box, just to name a few examples. However, for purposes of illustration and without limitation, in this example embodiment, a plan view of hand held device embodiment 100 is shown, including a touch sensitive or touch actuated or touch-activated surface 110 and a housing 120.

A touch surface, such as surface 110, may, in this context, sometimes also be referred to as a touch sensitive surface or a touch activated surface. In general, a touch sensitive surface may include a clear or transparent substrate with a configuration of sensors typically, but not necessarily, in contact with the substrate. A touch actuated sensor configuration may also be positioned in front of a display so that a touch sensitive surface covers at least a portion of a viewable area of the display. As indicated previously, for this particular embodiment, and as shall be explained in greater detail, an OLED structure embodiment may be employed here to provide a viewable area. The arrangement of this particular embodiment, for example, may allow a user to make selections or move a cursor, such as by touching a portion of a touch sensitive surface positioned in front of a display with an object (e.g., a finger), or by placing the object in close proximity to the surface. In general, a touch sensitive surface may recognize and electronically register a touch or other direct physical contact or a near-touch with the touch sensitive surface via touch sensors connected to processing components or circuitry within the hand held device, for example, capable of processing such actions, gestures or surface contacts. Therefore, a computing system including circuitry or processors, for example, may interpret the registered touches or near-touches and perform an action based at least in part on processing by the computing system. As used herein, the term computing system may refer to a specific or special purpose computing system. For example, in this instance, a computing system to process touch events or the like is described.

Figure 2:
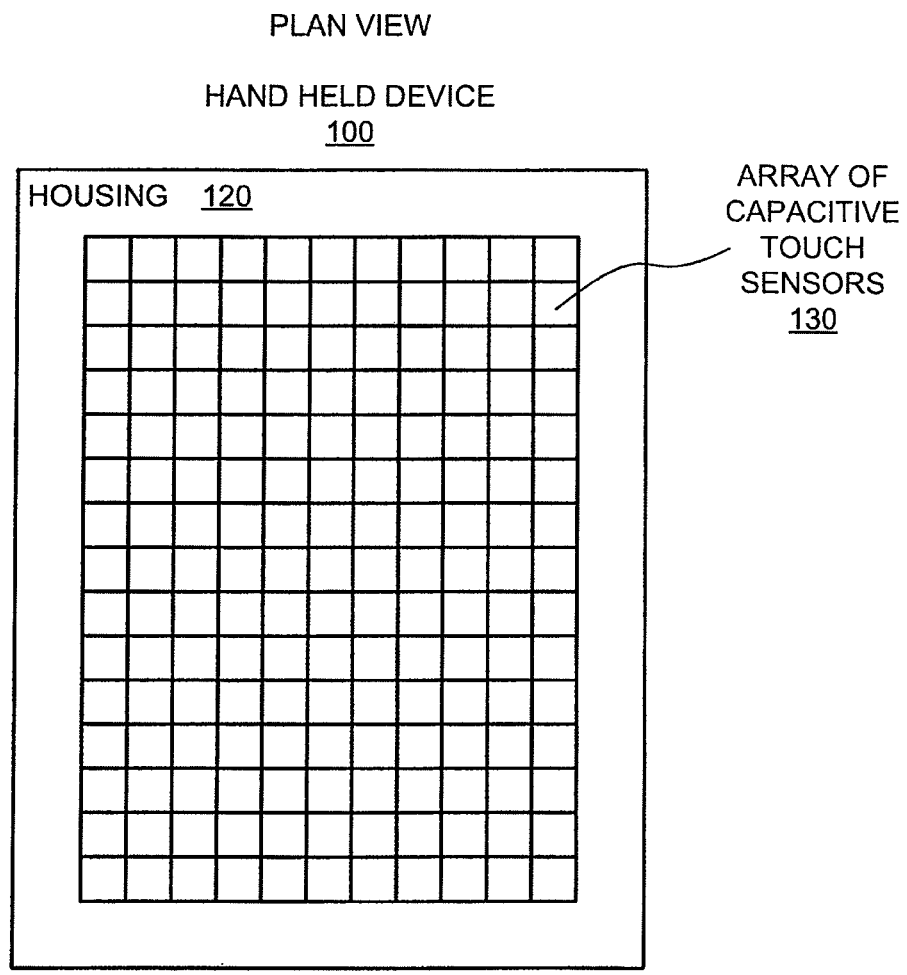
FIG. 2 is a plan view illustrating the example hand held device of embodiment of FIG. 1 in greater detail.

FIG. 2 is a plan view illustrating the example hand held device embodiment of FIG. 1 in greater detail. This particular embodiment, without limitation, illustrates hand held device embodiment 100 including an array of capacitive touch sensors 130 under a surface of a display (e.g., touch glass). For this particular embodiment, as suggested previously, an array of capacitive touch sensors may form a touch sensitive surface over at least a portion of a viewable area of a display screen. Again, in this particular embodiment, the viewable area may be provided by an OLED structure embodiment that shall be described in more detail later. It should be understood that this general illustration of an array of capacitive touch sensors 130 and hand held device 100 is merely a schematic depiction to aid the understanding of one of ordinary skill in the art. Hand held device 100, housing 120, and array of capacitive touch sensors 130, for example, are not illustrated to scale—particularly capacitive touch sensors 130. Furthermore, while a possible configuration using a particular sensing technology, here capacitive, is illustrated schematically, claimed subject matter is not limited to employing only capacitive touch sensor technology. Accordingly, many different configurations, touch sensing technologies, or various manufacturing processes may be employed without any departure from or with respect to claimed subject matter scope. It is, therefore, understood that any or all configurations, technologies, or processes, or the like, are intended to fall within the scope of claimed subject matter. What is provided herein are simply illustrative examples thereof.

As suggested previously, many different sensing approaches or technologies may be used in conjunction with a touch actuated sensor configuration embodiment integrated with an OLED structure embodiment. For example, a touch actuated sensor configuration embodiment may utilize, but is not limited to, touch actuated sensing technologies which may employ resistive, optical, surface acoustic, or capacitive technology, or any combinations thereof, just to a name a few. While for particular embodiments, disclosed herein, a capacitive touch actuated sensor configuration is illustrated in detail, it is to be understood that any or all other approaches or techniques may also or alternatively be utilized in connection with an OLED structure embodiment integrated with a touch sensor configuration embodiment.

Referring again to FIG. 2, a touch actuated sensor configuration may utilize capacitive sense technology. For this particular embodiment, a configuration of touch sensors having respective touch sensing locations may be formed. For example, one or more electrical structures may include a pattern of conductive traces (e.g., drive and sense lines) arranged in a manner so as to sense a change in capacitance which may be occasioned by an object, such as a finger, touching, contacting or hovering over a touch sensitive surface of a configuration that may include an array of touch sensors at particular touch points or touch locations. For example, an array of touch sensors may be formed from a pattern of conductive traces. As an object approaches a touch sensitive surface, one or more touch sensors of the configuration at particular touch sensing points or locations may experience a change in capacitance occasioned by proximity to the object. By detecting a change in capacitance at one or more touch sensing points or locations, and by noting the particular location or position associated with the change in capacitance, a sensing circuit may detect and register one or more touch events as, for example, an image of touch. After being detected and registered, touch events may be processed or otherwise used to at least in part control operation of an electronic device, such as for one or more operations of hand held device 100, by way of example. It is noted that throughout this specification, with respect to the operation of a touch sensor, the terms sensing points, sensing locations, touch point, touch locations or the like are used interchangeably.

Although a variety of particular embodiments are possible, configurations or arrangements for use in a touch actuated sensor configuration may include "self" capacitive or "mutual" capacitive configurations. In a "self" capacitive configuration, for example, capacitance may be measured relative to some reference, such as a ground or ground plane. In a "mutual" capacitive configuration, capacitance between drive and sense lines may be measured. Accordingly, "self" or "mutual" capacitive configurations may have similar or common aspects with respect to structural or electrical arrangements employed as well as dissimilar aspects with respect to structural or electrical arrangements employed, as described immediately below.

In a "mutual" capacitance sensing arrangement or configuration embodiment, for example, sensing locations may be formed by a crossing of patterned conductors formed from spatially separated conductive lines or traces. In one particular embodiment, conductive traces may lie in substantially parallel planes, the conductive traces of a particular plane being referred to here as being substantially co-planar, the substantially parallel planes in this particular embodiment otherwise being relatively close in proximity. Furthermore, substantially co-planar conductive traces may be oriented to be substantially parallel. However, conductive traces from different planes may be oriented so as to be substantially perpendicular in direction. That is, substantially co-planar conductive traces lying in a first plane having a first orientation or direction may be substantially perpendicular to substantially co-planar conductive traces lying in a second or in another plane having a second orientation or direction.

For example, in one embodiment, drive lines may be formed on a first layer in a first direction and sensing lines may be formed on a second layer in a second direction substantially perpendicular to the first direction such that drive and sense lines may "cross" one another at various touch sensing locations, albeit the drive lines being on a different layer of the configuration than the sense lines. It is noted herein that for the purposes of this patent application, the term "on" is not intended to necessarily refer to directly on. For example, a second layer may be formed on a first layer without the two layers being in direct physical contact. Thus, there may, continuing with the example, be additional layers or other material between these first and second layers. Notwithstanding the examples provided above, it should be understood that other non-perpendicular (e.g., non-orthogonal) orientations of the traces in the two planes are also possible.

A variety of other arrangements or configuration embodiments are also possible to provide a capacitance sensing arrangement or configuration, although claimed subject matter is not intended to be limited to any particular one. For example, conductive traces may be formed on different sides of a substrate. Conductive traces that may include shapes such as diamonds that cross in the manner discussed above may also be formed on one side of a substrate with an insulating separation, such as a dielectric, separating the traces at crossover locations. Conductive traces may also be formed on different substrates with the substrates being oriented so that the conductive traces lie in different substantially parallel planes while being on different layers. Employing a separation between drive and sense lines, in this particular embodiment, may result in capacitive coupling or capacitively coupled nodes between sense and drive lines at common locations or crossing locations that otherwise lie in different substantially parallel planes, as described above. In such an embodiment, these capacitively coupled locations may form an array of touch sensors.

In another example, an array of touch sensors may be formed from conductive traces and shapes such as patches and columns formed on the same layer on the same side of a substrate in a single-sided ITO (SITO) configuration, for example. In a SITO configuration, the drive lines may be formed from a row of patches of conductive material that may be connected through conductive traces and metal in the border areas of the panel. The sense lines may be formed as columns or connected patches of conductive material. Other SITO configurations are also possible. Therefore, claimed subject matter is not limited in scope to this particular description. In some SITO embodiments, electrical activation or stimulation of a drive line may result in mutual capacitance between adjacent drive and sense line patches or columns, for example. A finger or other object may result in a change in this mutual capacitance that may be detected by sensing circuits. Of course, these are merely example embodiments, and claimed subject matter is not intended to be limited in scope to these or any other particular embodiments.

A "self" capacitive configuration embodiment, in contrast, may measure capacitance relative to a reference ground or ground plane. Also, a self capacitive embodiment typically may employ an array or other arrangement of conductive patches or pads, such as Indium Tin Oxide (ITO) pads or patches. It is noted, without limitation, that a ground may be formed on the back side of a substrate, on the same side as an array of conductive pads or patches, but separated from the patches or pads, or on a separate substrate. It may take the form of a ground plane; however, likewise, any conductive element may serve as a reference relative to which self-capacitance may be measured, such as a chassis of a device or a ground conductor that plugs to a chord, for example. Measurement quality may depend at least in part on coupling between the object that increases self-capacitance through proximity to a patch or pad, for example, and the ground reference. We likewise note that claimed subject matter is not limited in scope to ITO. Rather, any transparent conductive material, such as, for example, ZTO, may likewise be employed or any combinations thereof. In a self-capacitance touch sensor configuration embodiment, self-capacitance of a sensor relative to the reference ground may be changed due at least in part to the presence of an object, such as a finger. In some self-capacitance embodiments, self-capacitance of conductive column traces, for example, may be sensed independently, and self-capacitance of conductive row traces may also be sensed independently.

In addition to different sensing approaches that may be used in conjunction with a touch actuated sensor configuration embodiment, there may also be different arrangements for a touch actuated sensor configuration embodiment. Some of these arrangements may depend at least in part on the manner or the processes utilized to form a touch actuated sensor configuration or a touch sensitive surface. For example, different arrangements may vary as to sensor or sensing point location as well as relative orientation of a touch surface to one or more of the touch sensors or sensing points. However, any or all arrangements are intended to be within the scope of claimed subject matter and, therefore, may be utilized with a host of possible touch actuated sensor configuration embodiments.

An aspect of an embodiment in which a touch actuated sensor configuration is integrated with an OLED structure relates to a process for manufacture or fabrication. For example, a touch actuated sensor configuration embodiment may be fabricated on one side of a substrate and an OLED structure embodiment may be fabricated on one side of another substrate in separate processes. The touch actuated sensor configuration embodiment and the OLED structure embodiment may be combined into a single module or IC so that the touch actuated sensor configuration embodiment and the OLED structure embodiment contact one another. Furthermore, in such an embodiment, one or more respective touch sensors of the touch actuated sensor configuration may be electrically connected to the OLED structure via a conductive paste, although claimed subject matter is not limited in scope in this respect. Other approaches are also available and intended to be included within claimed subject matter so that the touch actuated sensor configuration embodiment and the OLED structure embodiment may be physically, and in some embodiments, electrically connected, as described in more detail below.

Again, it is noted here that for this particular embodiment of an integrated module or integrated circuit (IC), for example, the touch actuated sensor configuration embodiment and the OLED structure embodiment may be fabricated by separate processes. Furthermore, in the particular embodiment, after fabrication, the touch actuated sensor configuration embodiment and the OLED structure embodiment may be physically, and in some embodiments, electrically connected. In one particular embodiment, for example, a conductive paste may be employed to form the electrical connections. It is noted that a variety of conductive pastes or other conductive materials may be employed and claimed subject matter is not limited in scope to a particular conductive paste; however, examples include a paste that may include a polymer or an adhesive and a conductive material, such as silver or gold. Likewise, typically a process may be employed to cure the conductive paste. As examples, heat may be applied, pressure may be applied, radiation may be applied, or any combination thereof.

One potential advantage of employing separate processes to fabricate the touch actuated sensor configuration embodiment and the OLED structure embodiment may be that OLEDs tend to be sensitive to high temperature or high pressure processes. On the other hand, high temperature or pressure processes typically are employed in the fabrication of a touch sensor configuration. Thus, employing separate fabrication processes may permit fabrication in a manner that is less likely to damage the OLED structure embodiment. Likewise, a process for curing a conductive paste typically involves less temperature or less pressure than a process to fabricate a touch actuated sensor configuration, again reducing the likelihood of damage to an OLED structure. Another potential advantage may be the ability to increase module or IC yield. For example, the touch actuated sensor configuration embodiment and the OLED structure embodiment may be tested after fabrication, but before being integrated. This may produce higher yields than otherwise might result.

Figure 3:
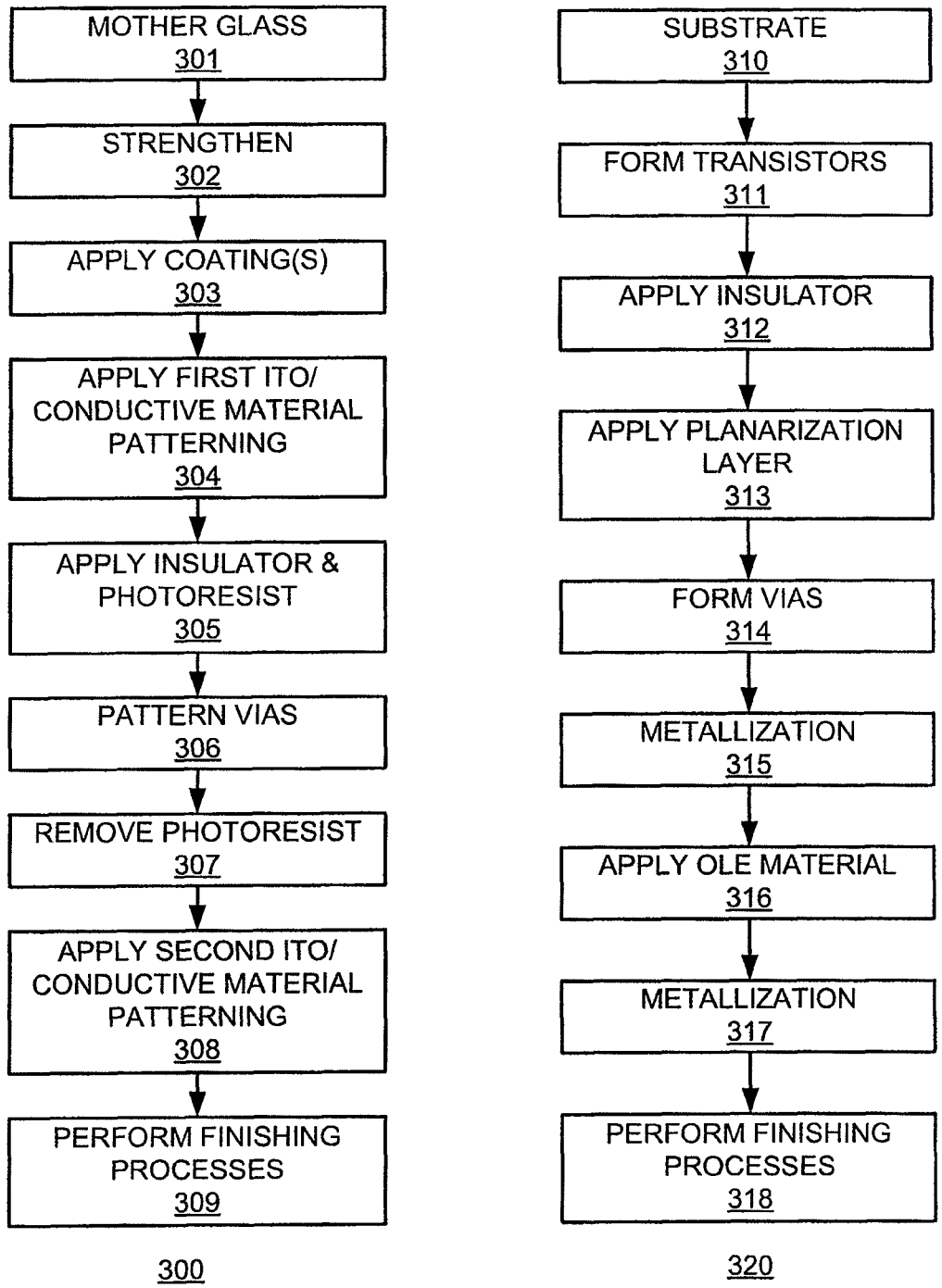
FIG. 3 is a first and a second process flow diagram respectively illustrating example process embodiments for making a touch actuated sensor configuration and for making an organic light emitting diode (OLED) structure.
Figure 4:
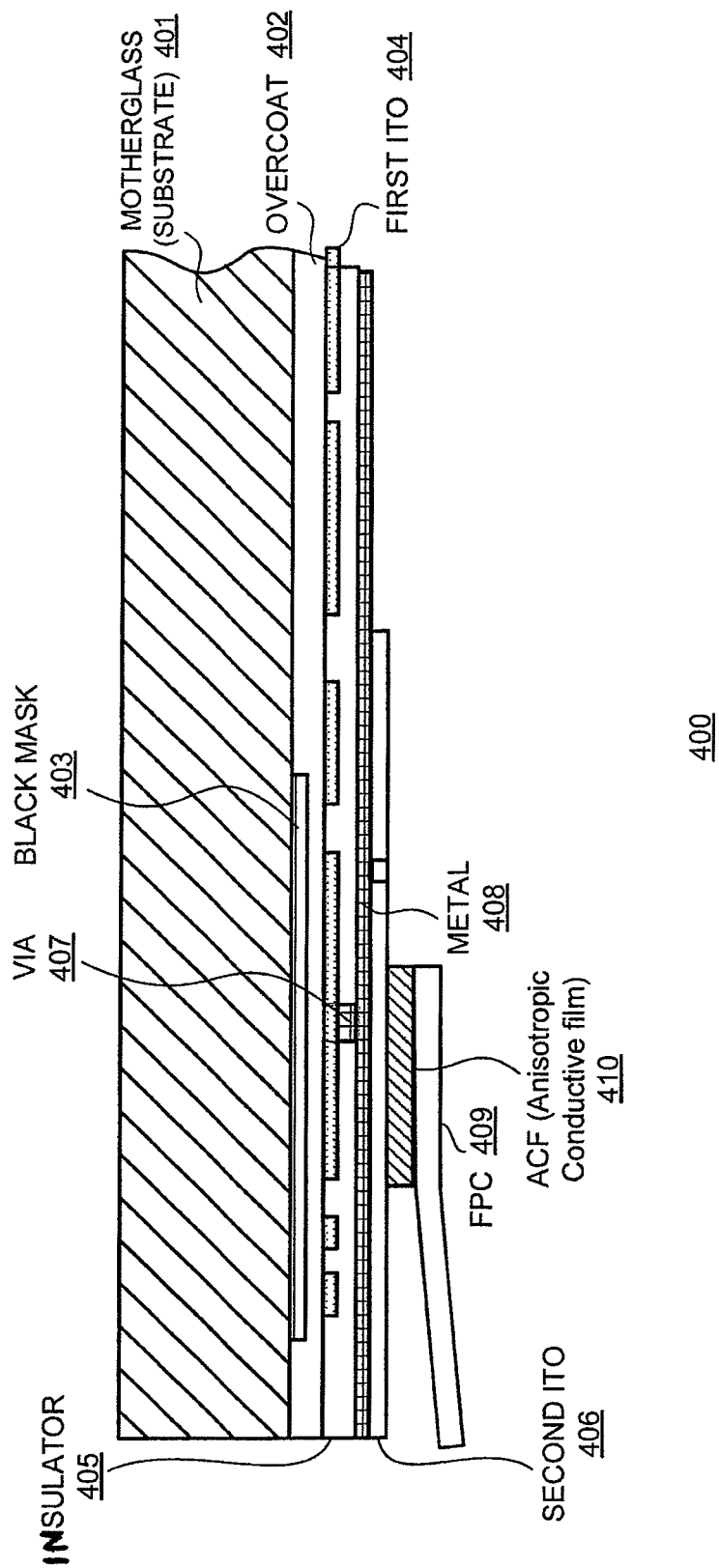
FIG. 4 is a side view illustrating an example touch actuated sensor configuration embodiment.

FIG. 3 is a flow chart or flow diagram illustrating an example process embodiment 300 for producing a touch sensor configuration embodiment. In the discussion below, reference is also made to a schematic diagram of a touch sensor configuration embodiment 400 as illustrated by FIG. 4. FIG. 3 also includes a flow chart or flow diagram illustrating an example process embodiment 320 for producing an OLED structure embodiment; however, that portion of FIG. 3 is discussed in more detail later. It should be understood that the process flow embodiments of FIG. 3 are provided as examples or illustrations. Therefore, it is further noted that some blocks may be omitted, additional blocks may be added to the flow, alternative blocks may be employed, or completely different fabrication processes involving a flow of different blocks may be utilized. Any and all other embodiments are intended to be included within the scope of claimed subject matter.

For this touch actuated sensor configuration embodiment, beginning at block 301, a substrate, such as a "motherglass," may be prepared for processing, from which a number of individual substrates may be produced, although it should be understood that singulated substrates may also be used. Reference now is made here to FIG. 4, which is a cross-sectional side view diagram of a touch actuated sensor configuration embodiment 400. Therefore, this configuration embodiment includes motherglass 401, as shown. Typical materials which may be used as a substrate include materials having properties such as being relatively inert to subsequent processing, not being opaque to radiation, or providing electrical insulation. For example, suitable materials for a substantially transparent substrate may include glass, plastic, ceramic, metallic, organic or inorganic materials, or any combination thereof. Likewise, at least some of these example materials may also be flexible or rigid.

Chemical strengthening may be performed on the "motherglass," as shown by block 302, which may involve employing a nitric acid bath at a high heat, resulting in compressive forces or stresses at the surface layer of the glass and tensile stresses at the inside core of the glass. Various coatings may be employed, illustrated at block 303, such as an anti-glare coating, which may include particle-embedded silicon dioxide, an anti-reflective coating, a black mask coating on selected regions, or an application of an overcoat layer. These various coating or layers may be applied using a variety of techniques, which may include printing, roller coating, or sputtering followed by etching of unwanted areas, as non-limiting examples. In some embodiments, such coatings may be omitted.

A clear or transparent overcoat may be formed, which may include a clear or transparent polymer curable with ultraviolet (UV) light. This is illustrated, for example, in FIG. 4 by overcoat 402. This coating may smooth over black mask areas, such as 403 in FIG. 4, for example, in some embodiments. Likewise, this coating may in some embodiments form a substantially planar surface for subsequent Indium Tin Oxide (ITO) sputtering or conductive material (e.g., metal) patterning at block 304. As suggested, ITO or other conductive material may be sputtered, or otherwise applied or deposited, and patterned, illustrated in FIG. 4 by 404. Depending at least in part on the particular configuration, conductive lines or conductive pads or patches may be patterned. At block 305, an insulator may be formed over the patterned ITO or other conductive material, illustrated in FIG. 4 by 405. An insulator may have dielectric properties. For example, insulator 405 may be formed so that a second layer of ITO or other conductive material may be later formed, although claimed subject matter is not limited in scope in this respect.

Additionally, at block 305, a photoresist may be employed. The photoresist may subsequently be patterned for the formation of vias, as indicated at block 306. FIG. 4, for example, illustrates via 407. A photoresist may be employed, among other things, to protect various structures underlying the photoresist from subsequent processing or manufacturing operations, such as metal sputtering, as only one example. Subsequent processing may be commenced in particular locations by removing photoresist at those locations, as indicated at block 307.

At block 308, depending on the particular embodiment, a second ITO or conductive material layer, illustrated in FIG. 4 by 406, and additional conductive traces (e.g., metal), illustrated in FIG. 4 by 408, may be formed using lithography, selective deposition using a stencil mask, blanket deposition, or other techniques, to create row or column traces, for example. The patterning of metal and an ITO or conductive material layer may be done with a photoresist, a single photo-exposure and one or two etching operations, as examples. The dielectric insulator previously formed may thus permit the ITO or conductive material layers to exhibit mutual capacitance at crossover points resulting in touch sensors at these locations. Alternatively, in an embodiment employing single layer ITO (SITO), ITO patches or pads on a single layer may form the touch sensors, with mutual capacitance formed across adjacent (or nearby) drive and sense regions.

It is noted that a host of manufacturing processes or operations may be involved in fabrication of a particular touch actuated sensor configuration embodiment, such as to fabricate additional layers, for example, that have not been mentioned specifically here. Nonetheless, at block 309, scribing, separating or various other finishing processes may be performed as desired. Thus, for example, the "motherglass" may produce individual parts for subsequent processing. In addition, individual parts may undergo further processing, such as mechanical or chemical polishing, grinding, shaping, or cleaning, to provide examples.

The example process embodiment illustrated in FIG. 3, and the example touch sensing configuration embodiment illustrated in FIG. 4, represent merely one approach. As suggested previously, for example, sensors or sensor locations may be formed on a single side of a single substrate, on opposite sides of a single substrate, or on one side of two different substrates. Furthermore, single ITO (SITO) or double ITO (DITO) layers of patterned ITO may be employed to form touch sensor or touch sensor locations. Again, any or all arrangements are intended to be within the scope of claimed subject matter and, therefore, may be utilized with a host of possible touch actuated sensor configuration embodiments.

Depending at least in part on a particular application and a particular embodiment, the number of touch sensors or their configuration may vary considerably. For example, these may vary based, at least in part, on a desired resolution or sensitivity for a particular embodiment. Similarly, these may also vary depending at least in part on a desired transparency. Likewise, an array of touch sensors may be arranged in a Cartesian or rectangular coordinate system. As one example embodiment, drive lines may be formed as horizontal rows, while the sense lines may be formed as vertical columns (or vice versa), thus forming a plurality of touch sensors that may be considered as having distinct x and y coordinates. This approach is depicted, albeit simplified, in example hand held device 100 at FIG. 2. In another approach, an array of ITO pads or patches may be arranged in a Cartesian or rectangular coordinate system. Likewise, a polar coordinate system embodiment may be employed. For example, conductive traces may be arrayed as a plurality of concentric circles with another set of conductive traces being radially extending lines. Conductive patches or pads may be similarly arranged, thus forming a plurality of touch sensors that may be considered as having distinct radius and angle coordinates. Furthermore, touch sensor configurations may also be formed so that sensors are arranged in any number of dimensions and orientations, including but not limited to, diagonal, concentric circle, three-dimensional or random orientations.

Returning to the embodiment of FIG. 4, conductive pads or patches forming touch sensors may also be electrically connected to various integrated circuits (ICs). Here again, there may be a variety of approaches or techniques to connect one or more ICs. Accordingly, in FIG. 4, a side view is provided to depict a simplified high-level touch sensor configuration embodiment. Here, conductive traces or conductive pads may be routed to an edge of the substrate so that a flexible printed circuit (FPC), such as 409 in FIG. 4, or other type of circuit, such as an IC, may be bonded to an area of the substrate. In this particular embodiment, an FPC or an IC may be connected to a configuration of touch sensors using an anisotropic conductive film (ACF) or paste, such as illustrated in FIG. 4 by 410, although claimed subject matter is not limited in scope in this respect.

Likewise, in some embodiments, an arrangement of touch sensors may be electrically connected to one or more drive circuits or one or more sense circuits. As one possible example, without limitation, a sense circuit may be operable to detect changes in capacitance indicative of a touch or near touch and transmit electrical signals representative thereof (e.g., an array of capacitance signal values corresponding to a plurality of touch sensor locations in a configuration of touch sensors) to a processor. However, in some embodiments, a sensing circuit may include the capability to process or in some form pre-process the capacitance signal values so that at least partially processed signal values may be provided for additional processing to another component, such as a processor or the like. In this context, a processor may include, for example, a controller or microcontroller, a digital signal processor, a microprocessor or an application specific integrated circuit (ASIC) containing processor capabilities, to provide several processor examples. Likewise, virtually any number of processors or ICs may be employed, depending, for example, at least in part on the particular application or the particular embodiment.

In some embodiments, a drive circuit may apply a voltage or current drive signal (e.g., a periodic signal) to one or more drive lines in the touch sensor panel. A relationship between this drive signal and a signal appearing at touch sensor locations may be a function of capacitive coupling, which may be affected by an object in contact with or in proximity to a touch sensor.

Returning to FIG. 3, an example process flow embodiment for producing an OLED structure embodiment is illustrated. As suggested previously, any or all approaches or techniques applicable to fabrication of an OLED structure embodiment may be encompassed within the scope of claimed subject matter. Therefore, the approaches, techniques or processes described are provide as illustrations and are not intended to limit the scope of claimed subject matter in any way. In the discussion below, reference shall also be made to the OLED structure embodiment shown in FIG. 5. This particular embodiment of an OLED structure may be referred to as an anode-common structure; though, as just mentioned, the scope of claimed subject matter may include any or all variations of OLEDs, including, but not limited to, cathode-common structures, dual-plate OLED (DOD) structures, active or passive matrix OLED structures, or the like.

Figure 5:
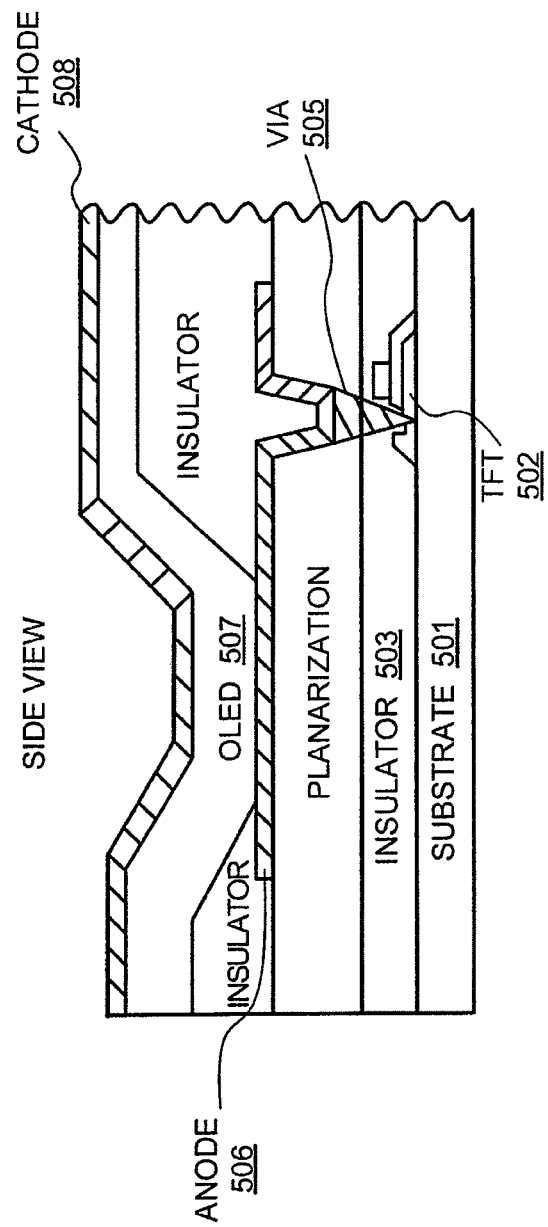
FIG. 5 is a side view illustrating an example OLED structure embodiment.

At block 310, a substrate, such as substrate 501 shown in FIG. 5, may be prepared for fabrication of an array or configuration of driving transistors, for example. Although claimed subject matter is not limited in scope in this respect, here, the driving transistors may include thin-film transistors (TFTs). At block 311, a transistor, such as TFT 502, shown in FIG. 5, may be formed on the substrate. Fabrication of transistors is a reasonably well understood technology and, therefore, will not be discussed at length here.

At block 312, an insulating layer, such as insulator 503 illustrated in FIG. 5, may be formed over the transistors. This insulating layer may assist in lessening electrical interferences, such as parasitic interference, for the TFTs or other electrical components that may be fabricated within the structure embodiment. At block 313, a planarization layer, such as 504 shown in FIG. 5, may be fabricated and form a substantially planar surface for subsequent deposition, patterning or other fabrication processes. At block 314, a via, such as via 505 in FIG. 5, may be formed and filled with conductive material, such as metallization, for example, as illustrated by block 315.

At block 316, a layer of organic light emitting (OLE) material may be applied or deposited over the metallization, forming anode 506 as shown in FIG. 5. Another metallization layer, in this embodiment forming a cathode 508, as shown in FIG. 5, may be formed over OLED layer 507. In this discussion the fabrication process has been simplified so as to avoid obscuring claimed subject matter. A host of manufacturing processes or operations may be involved in fabrication of a particular OLED structure embodiment, such as to fabricate additional layers, for example, that have not been mentioned specifically here. At block 318, one or more finishing operations may be performed, such as encapsulation, planarization, or various other techniques or approaches typically utilized in the fabrication of an OLED structure embodiment.

Yet another embodiment in accordance with claimed subject matter may include two substrates. The first substrate of the two substrates may include, on a first of two sides, a first layer comprising passive touch actuated sensors. The second of the two substrates may include, on a first of two sides, a first layer comprising driving thin-film transistors and a second layer comprising an OLE material sandwiched between metallization sub-layers. For this particular embodiment, the first and second layers of the second substrate may be mutually adjacent and arranged so that at least some of the thin-film transistors of the first layer are capable of electrically driving at least a portion of the OLE material sandwiched between metallization sub-layers. Likewise, the two substrates may be oriented so that the second side of the first substrate is most remote from the second side of the second substrate; that is, these may form the outer surfaces of the module or IC, for example.

In this particular embodiment, passive touch actuated sensors of the first layer on the first substrate may be electrically connected to a less remote metallization sub-layer of the OLED structure. As explained for previous embodiments, the passive touch actuated sensors of the first layer on the first substrate are thus capable of being electrically coupled to a stimulation signal, a sensing circuit, a power source or to ground, such as via a metallization sub-layer, such as a thin-film transistor layer on the second substrate, for example.

In addition to the embodiments just discussed, a variety of additional module or IC embodiments are possible and included within the scope of claimed subject matter. For example, an embodiment may include more than one substrate included within a touch actuated sensor configuration embodiment. Thus, a touch sensor configuration may be sandwiched between two glass substrates, with one forming a protective outer cover glass while the other substrate includes ITO pads or patches formed on it. In the embodiment illustrated in FIG. 5, touch sensors maybe on the surface of the substrate least remote from the organic light emitting (OLE) material. However, in another embodiment the touch sensors may also be on the surface of a substrate most remote from the OLE material, if desired, since a protective outer cover glass is also provided. Likewise, a DITO touch sensor configuration may be employed that is similarly sandwiched between glass substrates with an insulating layer within the configuration to separate the ITO layers. A host of other arrangements are also possible and claimed subject matter is not intended to be limited to any particular arrangement. All arrangements or embodiments are intended to be within the scope of claimed subject matter.

Devices that integrate an OLED display structure with a touch sensor configuration unfortunately may potentially lead to electrical interference issues. For example, a transistor or TFT drive circuitry for an OLED display structure may interfere with a capacitive touch sensor configuration assuming, in this particular embodiment, capacitive technology is employed. For example, as previously described, a module or integrated circuit (IC) may include one or more touch sensor arrays, such as various layers as previously described (e.g., SITO; DITO), as well as layers forming an OLED display structure.

As was previously described, in one embodiment, for example, a periodic waveform may be employed or applied. Such a signal, for example, may be applied to drive a variety of drive lines or traces. Likewise, as previously described, a variety of sense lines or traces may be at crossing locations such that a finger or other object within proximity of such sense lines may result in a change in mutual capacitance that may be detected by sensing circuits. Also as previously described, a similar "self" capacitive approach may likewise be employed. In such embodiments, sensing circuitry, such as previously described, may sense a change in capacitance. Changes in capacitance typically result in the movement of charge or result in current. In contrast, capacitances that remain substantially steady, consistent, or constant typically will not typically result in a signal change that may be sensed by such lines or traces and detected, as explained below, for this particular embodiment at least.

An electrical interference issue may arise, however, due at least in part to parasitic capacitance that may at times exist in connection with electrical circuitry. Nonetheless, at least in this particular embodiment, parasitic capacitance should not produce a signal change that would be sensed and detected by an embodiment of a touch sensor configuration as was just described, for example. For this particular embodiment, sensing occurs in connection with changes in capacitance, as described above. For example, although claimed subject matter is not limited in scope in this respect, sense lines may be applied to a circuit configuration that includes an operational amplifier with a feedback capacitance coupled between the output port of the operational amplifier and the negative input port of the operational amplifier. Although claimed subject matter is not limited in scope in this respect, such a circuit configuration may be employed to detect changes in charge coupling due at least in part to a change in mutual capacitance, for example. On the other hand, changes in capacitive coupling due at least in part to parasitic capacitance may result in a signal that may be sensed and detected in circumstances in which it was not intended that an effect in the touch sensor configuration be detected. Typically, if this occurs, an error may result. It is, therefore, desirable that the opportunity or risk of errors occurring be reduced.

Claimed subject matter is, of course, not limited in scope in this respect. However, as an example, in a situation in which pixels of a display are arranged in row and column configurations, signals employed to drive particular pixels of a display by a driving transistor, for example, may produce a measurable or detectable change in capacitance. Due at least in part to a relatively close proximity of a display structure to a touch sensor configuration, for example, a signal that may be induced, for example, by a parasitic circuit parameter, such as parasitic capacitance, may therefore be detected that is not the result of an object coming within relatively close proximity of the touch sensors, and, therefore, as indicated previously, one or more errors may result. To rephrase, a false touch event may be detected.

It is noted that this effect may occur if an image being displayed by a display structure is changing. In general, however, if the image being displayed is relatively static, this should not result in changes in voltage within a display structure for this particular embodiment. Thus, a signal likewise would typically not be induced in the sensing lines of a touch sensor configuration, again, for this particular embodiment.

One approach that may be employed to reduce incidence of detecting a false touch event based at least in part on a signal induced by a parasitic circuit parameter, such as capacitance, may involve operating a touch sensor configuration during a different time interval than a display structure. In this particular context, this approach may be referred to as time multiplexing. Thus, the operation of an OLED display structure may be time multiplexed with the operation of a touch sensor configuration so that the two operate during non-overlapping time intervals. This is illustrated, for example, by the plot of FIG. 6. In this manner, voltage changes that may occur in an OLED display structure should not be sensed and detected by a touch sensor configuration and, therefore, should not produce a false touch event, as an example.

Figure 6:
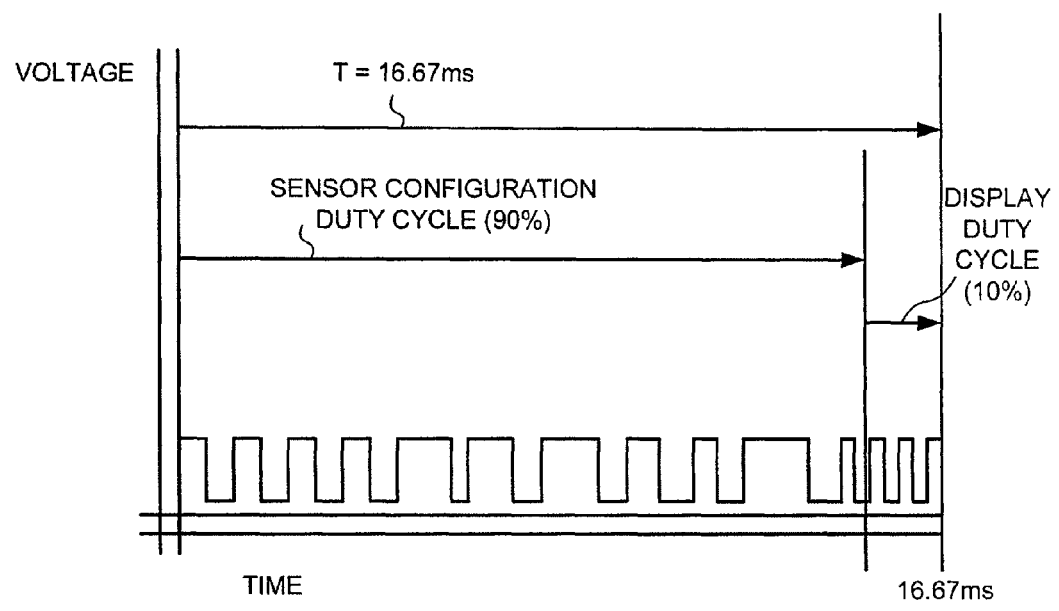
FIG. 6 is a plot of voltage signal level versus time illustrating operation of an example implementation of an embodiment.
Figure 7:
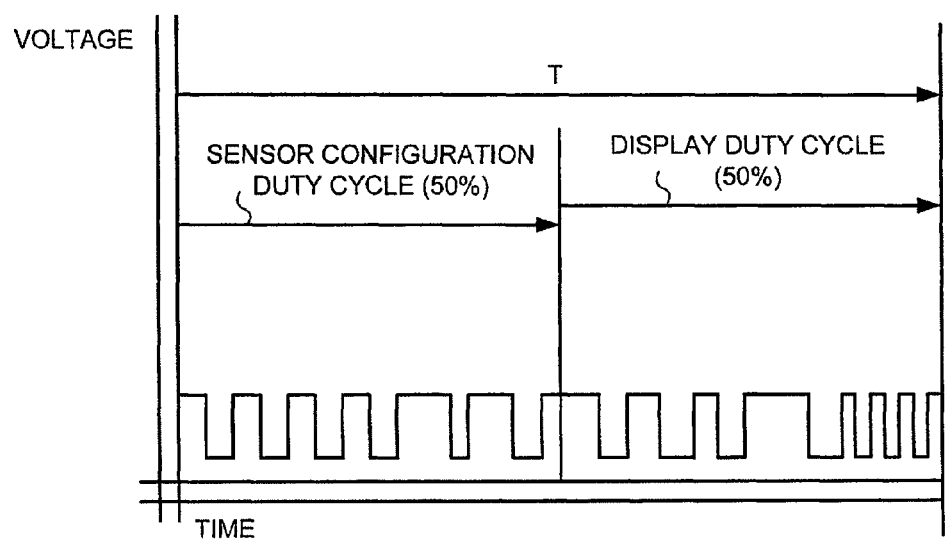
FIG. 7 is a plot of voltage signal level versus time illustrating operation of another example implementation of an embodiment.
Figure 8:
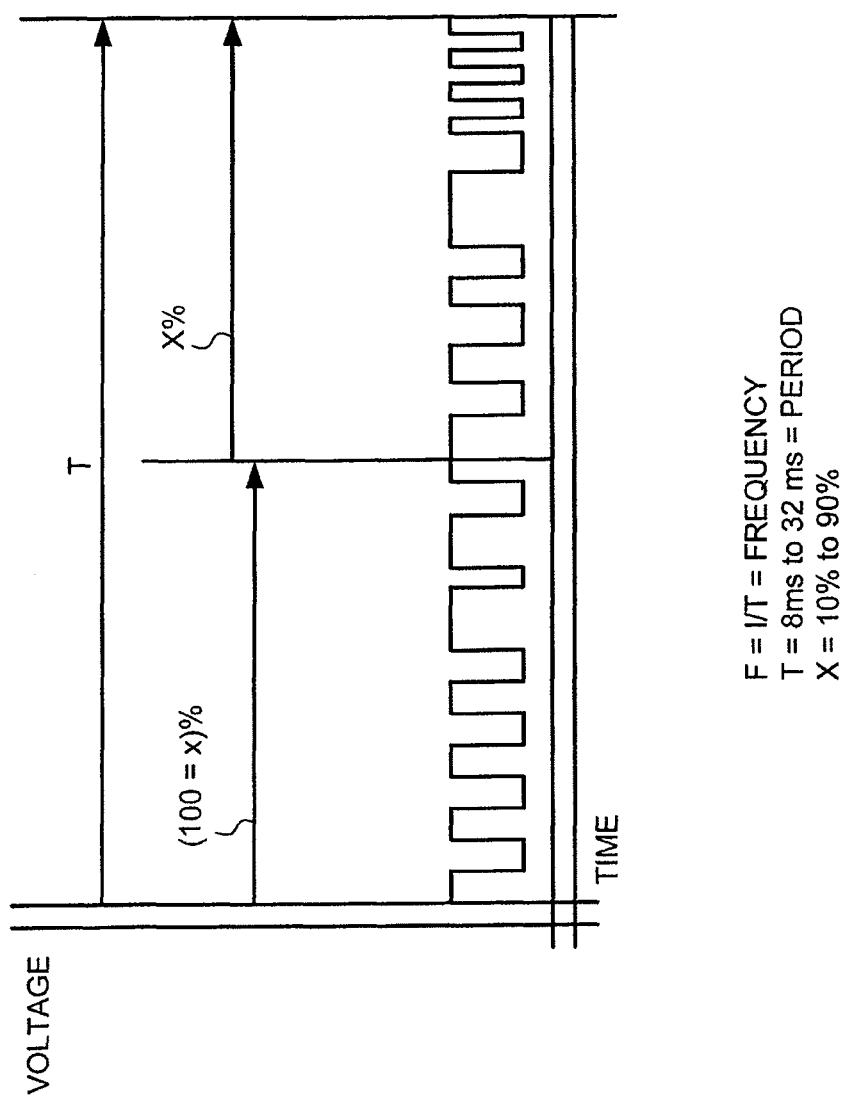
FIG. 8 is a plot of voltage signal level versus time illustrating operation of yet another example implementation of an embodiment.

Although claimed subject matter is not limited in scope in this respect, as an example, consider a device which operates at a 60 Hz rate or 60 cycles per second. In this example, in one 60th of a second, a new potential image may appear on a display of the device. Signals, such as voltage signal levels as shown by FIG. 6, applied to pixels of the display may change about one 60th of a second, if not more frequently. It is noted that the waveforms illustrated in FIGS. 6-8 are not intended to be depict actual waveforms, but are merely illustrative to demonstrate changes in voltage signal levels. In such a device, however, as just described, the time interval between such images would be 16.67 milliseconds (ms). Using this as one illustrative example, within that time frame, a portion of 16.67 ms, such as 15.003 ms (e.g., 90%) may be allocated to operation of a touch sensor configuration and a portion, such as the remaining time or 1.667 ms (e.g., 10%), may be allocated to processing display signals. Again, this approach is illustrated by FIG. 6. Of course, this is merely an illustrative example and claimed subject matter is not intended to be limited to any particular example allocation of a time interval.

One disadvantage of employing an approach as previously described, however, is that a time budget, such as the one described above, may result in operation of a device, such as in this example, in which components may be pushed into regions of operation where satisfactory component or other device operation may be less likely. That is, using the example previously described, although again the claimed subject matter is not limited in scope in this respect, a portion of the 16.67 milliseconds is allocated to touch sensing and processing of touch sensing signals, etc. while the remaining portion is allocated to operation of a display structure. In an approach such as this, these constraints may ultimately test the limits of satisfactory operation for components employed within the device, for example. Thus, while incidence of parasitic errors may be reduced by the approach illustrated by FIG. 6, nonetheless, the opportunity or risk of other performance errors may be increased as a result.

Therefore, for example, it may be desirable to have lower resistance lines or other design improvements so that a timing budget can be implemented within a sufficient safety margin so that deviations from satisfactory operation, as just described, are less likely to be an issue. In a situation such as this, more expensive processes or more expensive components may be employed to achieve safe operating margins. Alternatively, an approach might be formulated in which components in a device do not operate close to the limit of satisfactory operation, while also reducing risks of detecting or measuring one or more false signals that are associated, instead, with parasitic circuit parameters. If such approaches, for example, are employed, additional margin may be available for the components without the need to employ more expensive approaches to address potential electrical interference. For example, in one embodiment, a method of operating a touch-sensitive screen display of a device may include modulating one or more display operating parameters of the device based at least in part on detecting touch events on the touch-sensitive screen. Without limitation, and as explained in more detail below, display operating parameters may include, for example: a display frame rate; a display duty cycle; or a set of pixels of the display held steady for two or more display frame cycles. These are meant as illustrative examples rather than an exhaustive list, of course.

Likewise, for some embodiments, display operating parameters may be modulated in any combination of two or more. Again, these example embodiments are explained in more detail below.

In this specific context, a rate at which a displayed image is changed, as previously described, is referred to here as a display frame rate. Thus, if a displayed image may change as frequently as 60 times a second or 60 Hz, then in this context, the display frame rate for a device is referred to as 60 Hz. One approach to address electrical interference, such as those previously described, for example, may involve modulating a display frame rate based at least in part on detection of touch events. For example, in one embodiment, a display frame rate may be decreased based at least in part on a presence of detected touch events, whereas a display frame rate may be increased based at least in part on an absence of detected touch events.

In a mode of operation as just described, therefore, if a display frame rate is typically 60 Hz, the display frame rate may decrease to something less than 60 Hz based at least in part on a presence of detected touch events. In this manner, for example, there may be less signal interference as a result of a decrease in frame rate. More specifically, reducing a display frame rate may reduce the frequency at which voltage signal levels within a display structure may change. Therefore, a parasitic signal may be less likely to be induced that may produce an error, such as a false touch event, for example. Likewise, after touch events are no longer detected, such as, if an absence of detected touch events occurs, a display frame rate may increase back to a standard frame rate, in this example, 60 Hz.

In addition to modulating the display frame rate, other features may also be modified to reduce the incidence of parasitic signals that may potentially result in a false touch event or other undesired errors. For example, a proportion of time employed to perform detection of touch events versus a proportion of time employed to operate a display structure within a given time interval or time segment may also be modulated. In this context, an allocation of time within a time interval to perform a particular activity may be referred to as a duty cycle. Therefore, a duty cycle for display operation, referred to here as a display duty cycle, may be modulated concurrently or in coordination with a display frame rate is also being modulated, for example, although claimed subject matter is not limited in scope in this respect.

In some embodiments, a display frame rate may be modulated without modulating a display duty cycle or alternatively, a display or other duty cycle may be modulated without modulating a display frame rate. Such embodiments are intended to be within the scope of claimed subject matter. Nonetheless, more typically, it may be desirable to modulate a variety of operating parameters depending at least in part on a host of potential factors, such as detection of touch events. Other examples of factors that may be employed at least in part to modulate such parameters may include, without limitation: frequency of touch events; location of touch events; particular portions of a display remaining relatively static; particular portions of a display not remaining relatively static; amount of change observed in a particular region or portion; or any combination of the foregoing. The foregoing list is meant to be illustrative, rather than exhaustive, to indicate that a variety of factors may be measured as a device is operated and those factors may be employed to make determinations as to adjustments regarding display frame rate, display duty cycle, or other device operating parameters, for example.

It is noted, however, that the foregoing merely describes a particular example of a mode of operation. Other modes of operation are possible and are intended to be included within the scope of claimed subject matter. For example, as previously suggested, one approach to reducing electrical interference or potential electrical interference may include employing a display structure in which an image shown on the display structure is static or, in this context, voltage signal levels that produce a particular image are held stable or constant for a period of time. This particular example mode of operation may be applied by itself to reduce potential electrical interference or it may be combined in an embodiment with other operating modes to reduce potential electrical interference in combination.

Continuing with the example previously described of a display frame rate, it may be possible, if touch events are detected, to retain or hold a particular frame image for more than one cycle. For example, the particular image shown by the display structure may be held for one or more additional cycles concurrently with detection of touch events so that voltage signal level changes that might otherwise be occurring in a display structure do not occur during a particular period. Therefore, electrical interference potentially inducing a signal that may be detected by a touch sensor configuration may be reduced at such time.

However, in connection with this latter mode of operation, it may be desirable to increase display frame rate at some point above a standard or typical display frame rate, for example. In this manner, the amount of time the display may remain static may be at least partially compensated by an increased frame rate after touch events are no longer detected. Therefore, in the example previously described, a display frame rate may be increased based at least in part on an absence of detected touch events. It may therefore be appropriate or desirable in some embodiments or in particular situations for a display frame rate to increase above a standard frame rate, such as above 60 Hz in the example used herein. Again, for purposes solely of illustration, it may be appropriate or desirable to increase to a frame rate of 120 Hz after touch events are no longer detected. In this manner, a frame rate may be adjusted based at least in part on detection of touch events so that an effect of potential parasitic capacitance may be reduced through a decrease in display modulation, as described in detail previously. However, after touch events are no longer detected, display frame rate may increase above 60 Hz, again, as an example, to at least partially compensate for a visual effect of holding an image static. For example, adjustments in display rate may affect perceptions by the human eye, depending, for example, on the various rates and the change in such rates, so that a static image may be less readily apparent or less visually disturbing. Of course, 60 and 120 Hz are provided merely as illustrative examples. In alternative embodiments, other rates may be used. To provide another example, an embodiment may vary from 30 to 60 Hz; however, again, claimed subject matter is not limited in scope to such an example. Note that in this particular context, the previously example, may be referred to a mixed mode of operation. In this particular embodiment, modifying the display rate is occurring on conjunction with employing a static image or portion of an image. Other mixed mode operation examples are provided in more detail below; however, it is not intended that an exhaustive list of possibilities be provided. Rather, these examples are intended as illustrative.

One aspect of modulating a duty cycle, such as a display duty cycle, for example, as previously described, relates to increasing a proportion of time employed to process signals for a display structure as a concurrent increase in display frame rate takes place. In other words, to provide an example, if a display frame rate has increased from 60 Hz to 120 Hz, if a display duty cycle is kept relatively constant, the amount of time available to process signals within a display structure is reduced by half because the overall period of time available is reduced by half. However, again, to reiterate, these values are intended to be illustrative and are therefore in no way intended to limit claimed subject matter. However, continuing with this example, f a display frame rate has been increased based at least in part on an absence of detected touch events, a proportion of time within a cycle employed to process touch events may be reduced to thereby increase a proportion of time to process display signals for the display structure without a significant decrease in overall performance for the touch sensor configuration. Therefore, it may be desirable in some circumstances, depending at least in part on a variety of factors, to increase a display duty cycle as an increase in frame rate occurs. This is illustrated, for example, in FIG. 7. Here, as period T may be modulated, such as to 8 ms, a display duty cycle may also be modulated. In FIG. 7, the display duty cycle is increased to 50% to account for an increase in frame rate that might otherwise reduce the amount of time employed to process signals for a display structure. For example, as previously alluded to, adjustments in display rate or duty cycle may affect perceptions by the human eye, depending, for example, on the various rates and the change in such rates, so that a static image may be less readily apparent or less visually disturbing. Again, this is merely one example of an implementation of an embodiment, and claimed subject matter is not limited in scope in this respect.

Likewise, in yet another embodiment, it may be desirable to hold a row of pixels and a column of pixels corresponding to a touch location at their particular pixel voltage level values for a particular image being displayed rather than holding an entire image static or retaining the entire particular image within the display structure. An advantage here may be that visually the effect may be more acceptable than if the entire image were to remain static. Of course, desirability here may turn at least in part on human visual capabilities or human visual perceptions.

In a display structure employing rows and columns with a touch sensor configuration employing rows and columns, for example, a rationale for retaining voltage signal level values steady along a row and a column corresponding to a particular touch location is that voltage changes within a display structure typically take place along rows and columns. Therefore, maintaining static values corresponding to touch event detection reduces the risk of inducing a signal associated with a parasitic capacitance, for example, that may produce a false touch event within a relatively close proximity to an actual touch event.

Of course, an advantage of such an approach may vary with the particular operation of a particular display structure as well as a particular touch sensor configuration. For example, here it is assumed that voltage values for a display structure may vary along a particular row as well as along a particular column. However, depending at least in part on details of operation, it may be desirable to hold a row static without holding a column static or vice-versa. Likewise, it may be that other configurations for static operation may be desirable, such as an array or subarray of display pixels not necessarily related to a particular row or column associated with a touch event location. For example, without limitation, perhaps concentric box shapes or concentric circular shapes around a particular touch event location may be desirable.

In a particular embodiment, it may also be desirable to include a mixed mode operation. For example, if the voltage levels of a row and column of display pixels are retained for two cycles based at least in part on detecting touch events after an absence of touch events is detected, it may be desirable to increase display frame rate and have it increase above a standard rate once an absence of touch events is once again detected. Likewise, modulating the duty cycle concurrently for similar justifications as those previously provided may be desirable in some embodiments. Similar to the approach previously described, it may also be appropriate or desirable to employ a variety of factors to make determinations regarding varying a set of device operating parameters that may affect internal electrical interference and, as a potential consequence, device performance. Factors that may influence such determinations, again intending to be illustrative rather than exhaustive, may include the amount of change taking place cycle-to-cycle within the recent past over an entire display. Any one of a number of mathematical operations may be employed to measure image changes producing a visually perceptible impact, to identify locations where more of such changes are occurring on a display, or to identify or detect a host of other factors that may be employed to make real-time or nearly real-time determinations regarding adjustments to operation so that images perceived by a user, for example, are not disturbing or significantly less visually appealing. FIG. 8 is a plot illustrating yet another example implementation of an embodiment. In the example of FIG. 8, a period T may vary between 8 and 32 ms, and the display duty cycle and sensor configuration duty cycle may likewise vary.

It is noted that one desirable aspect of holding voltage level values for a row and column with pixels relatively constant rather than holding an entire image static may be a perceived reduction in visual degradation. That is, as previously suggested, perceived visual degradation resulting from a static row and column may be less than if voltage signal level values for an entire image are held steady. Holding voltage signal level values relatively steady or constant for a row and column of a display associated with a touch event location may reduce local voltage signal level changes and, likewise, undesirable signals that might otherwise be detected by a touch sensor configuration in relatively close proximity to that row and column. However, if other portions of an image on a display are nonetheless changing, voltage changes that are less proximate to a touch event location may be occurring, and electrical interference may nonetheless result that may potentially induce an error, such as a false touch event. It is noted that a variety of trade-offs here may vary here with a variety of embodiments as well as a variety of other factors that may depend at least in part on the particular device and the particular applications of such a device. No one of set of trade-offs is expected to be ideal for all devices or applications. However, it is intended that such trade-offs be included within the scope of claimed subject matter.

Figure 11:
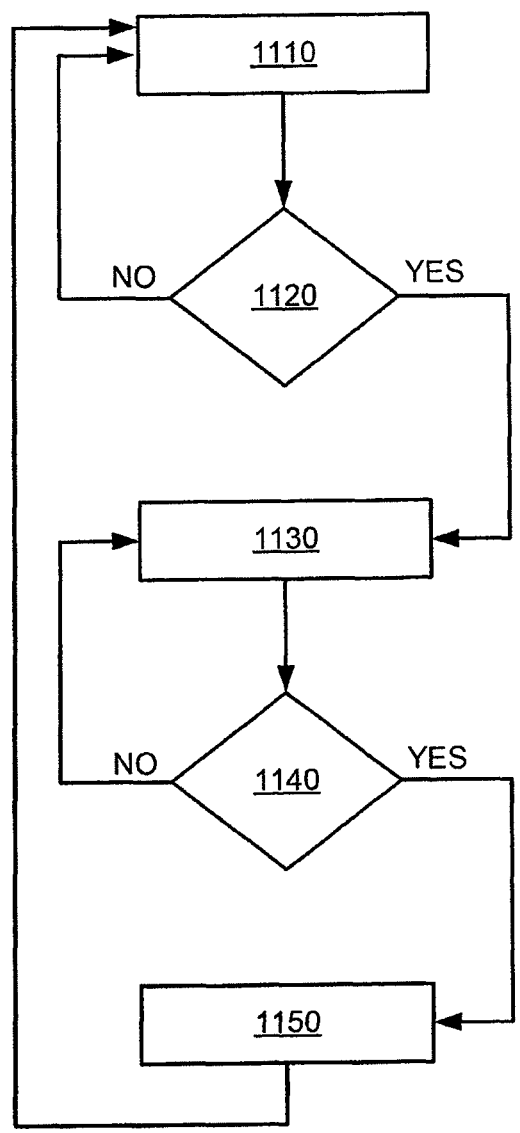
FIG. 11 is a flow chart illustrated various embodiments of a method of operating a touch-sensitive screen display.

FIG. 11 is a flow chart or flow diagram illustrating an example process embodiment 1100 for operating a touch-sensitive screen display for a device. FIG. 11 includes a flow chart or flow diagram illustrating an example process embodiment 1100. It should be understood that process flow embodiments of FIG. 11 are provided as examples or illustrations. Therefore, it is further noted that some blocks may be omitted, additional blocks may be added to the flow, alternative blocks may be employed, or completely different processes involving a flow of different blocks may be utilized. Any and all other embodiments are intended to be included within the scope of claimed subject matter.

FIG. 11 is employed to depict a host of potential embodiments. For example, in one particular embodiment, at block 1110 a device may maintain a standard or default display frame rate; at block 1120 a device may determine if touch events are detected; at block 1130, a device may reduce display frame rate if a touch event was detected; at block 1140, a device may again determine if touch events are detected; and at block 1150, a device may increase display rate to a standard or default rate if a touch event is no longer detected. These blocks are consistent with embodiments previously discussed.

However, in an alternate embodiment, at block 1110, instead a device may maintain a standard display frame rate and duty cycle. Here, at block 1130, a device may reduce display frame rate and duty cycle, while, at block 1150, a device may increase frame rate and duty cycle to a standard rate. These blocks are again consistent with embodiments previously discussed, for example.

Blocks 1130 and 1150 may depict other operations capable of being implemented in additional embodiments. For example, in one embodiment, for block 1130, voltage signal levels may be held steady for a particular row and column associated with the location of a touch event, and a display frame rate may be reduced. Likewise, for block 1150, a display frame rate may be increased above a standard or default frame rate, as described previously. In another embodiment, for block 1130, voltage levels may be held steady and a display frame rate and a display duty cycle may be reduced. For that embodiment, for block 1150, a display frame rate and a display duty cycle may be increased above a standard or default frame rate, as described previously. However, again, there are examples meant to be illustrative rather than exhaustive.

Figure 9:
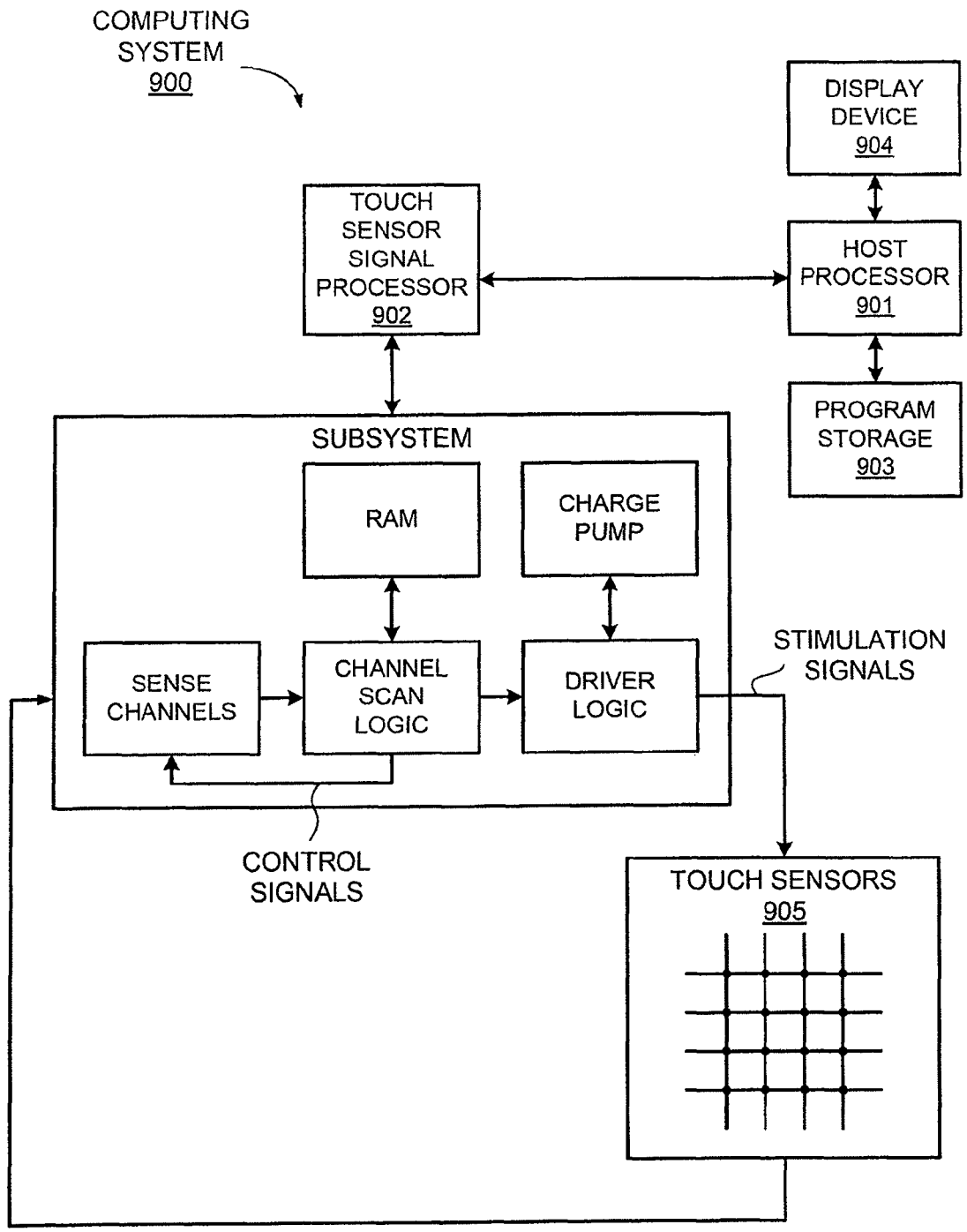
FIG. 9 is a block diagram illustrating an example computing system embodiment.

FIG. 9 illustrates a computing system embodiment 900 which may employ a module or IC embodiment formed by integrating a passive touch actuated sensor configuration embodiment with an OLED structure embodiment. For example, display device 904 and touch sensors 905 may be integrated in a module or IC. Computing system 900 may include host processor 901. Host processor 901 may perform functions, which may or may not be related to processing touch sensor signals, and may be connected to program storage 903 and display device 904, for providing a user interface for the device. Host processor 901 may also be operable to receive electrical signals from touch sensor signal processor 902. Touch sensor processor 902 processes signals from touch sensor configuration subsystem 906. Touch sensors 905 provide signals to subsystem 906. Host processor 901 may be capable of performing actions based at least in part on signals from touch sensor signal processor 902 that may include, but are not limited to, moving an object, such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing volume or other audio settings, storing signal information related to telephone communications such as addresses, frequently dialed numbers, received calls, missed calls, logging onto a computer, a computing device, or a network, permitting authorized individuals access to restricted areas of the computer, computing device, or network, loading a user profile associated with a user's preferred arrangement of a computer or computing device desktop, permitting access to web content, launching a particular program, encrypting or decoding a message, or the like.

Note that one or more of the operations described above may be performed in conjunctions with software or firmware stored in memory (e.g. the RAM or program storage in FIG. 9) and executed by touch processor 902 or host processor 901. Software or firmware may also be stored or transported via any computer-readable storage medium for use by or in connection with an instruction execution system, apparatus, or device, such as a specialized or special purpose system. This may include, for example, and without limitation, a special purpose computer-based system, a special purpose processor-containing system, or any other special purpose system. Typically, such systems may include the ability to fetch and execute specialized, specific or special purpose instructions for use in conjunction with a specific, specialized or special purpose instruction execution system, apparatus, or device. In this context, a "storage medium," such as, for example, a specialized or specific machine-readable storage medium, a specialized or specific purpose computer readable storage medium, or the like, refers to any storage medium that can contain or store software, such as a program, typically, a specific or special purpose software program, for use by or in connection with a specific, specialized or special purpose instruction execution system, apparatus, or device. A storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory, such as compact flash cards, secured digital cards, USB memory devices, memory sticks, or the like. These examples are provided here as illustrations and are not intended as an exhaustive list of possible storage media.

A computing device or system, such as embodiment 900, by way of example, may include firmware. Firmware may also be propagated within any transport medium for use by or in connection with an instruction execution system, apparatus, or device, such as a computer-based system, processor-containing system, or other system that is able to access instructions from an instruction execution system, apparatus, or device and execute the instructions. In this context, a "transport medium" may be any medium that is able to communicate, propagate or transport a computer or computing program for use by or in connection with the instruction execution system, apparatus, or device. The transport readable medium may include, but is not limited to, an electronic, magnetic, optical, electromagnetic or infrared wired or wireless propagation medium.

Figure 10:
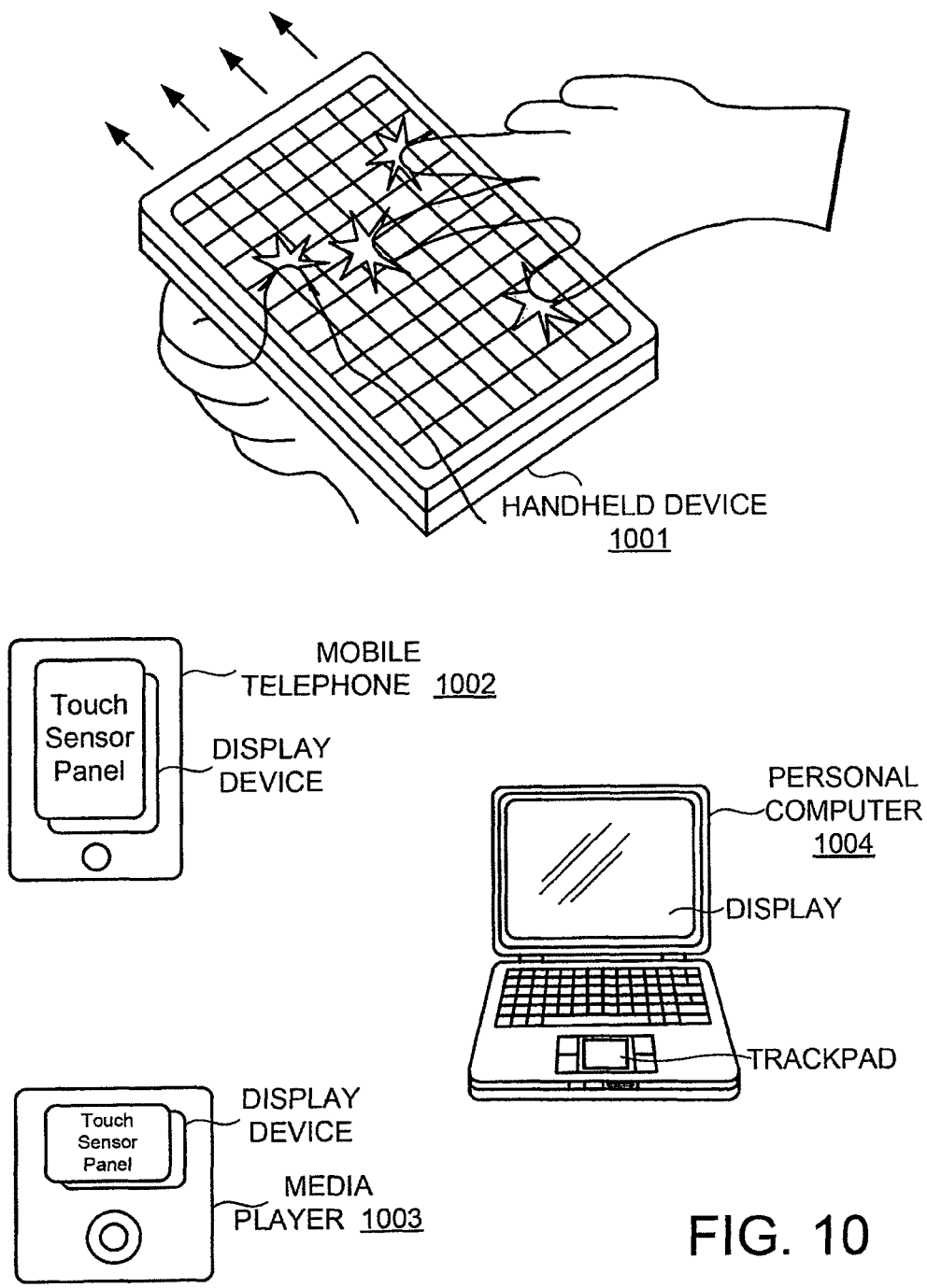
FIG. 10 is a schematic diagram illustrating various example device embodiments.

FIG. 10 is a schematic diagram illustrating various devices which may include or employ a module or IC embodiment formed by integrating a passive touch actuated sensor configuration embodiment with an OLED structure embodiment. For example, hand held device embodiments 1001, 1002 or 1003 may include a module or IC embodiment formed by integrating a passive touch actuated sensor configuration embodiment with an OLED structure embodiment and may be capable of transmitting signals to or receiving signals from various other devices, such as via a wired or wireless communication interface. Embodiment 1001 corresponds to the embodiment previously illustrated by FIG. 1, for example. Likewise, a mobile telephone embodiment 1002 is depicted, as is a digital media player embodiment 1003 and a personal computer embodiment 1004. These devices may have improved overall functionality or reliability, may be manufactured at a lower cost or with higher yield, or may exhibit characteristics which consumers may find desirable, such as being smaller, lighter, thinner, or the like.

While there are numerous particular advantages to this particular exemplary embodiment, one advantage may be that the previously described embodiments may result in a better yield, and potentially lower costs, during the manufacturing process. Similarly, embodiments in accordance with claimed subject matter may allow devices to be smaller, lighter, or thinner, which consumers generally find desirable. For example, after fabrication of a module, such as one of the previously described embodiments, the outer glass substrates may be thinned, such as by chemical polishing, mechanical polishing, other processes, or by a combination of a variety of processes.

Although embodiments have been fully described with reference to the accompanying drawings, it is to be noted that various changes or modifications may become apparent to those skilled in the art. Such changes or modifications are to be understood as being included within the scope of claimed subject matter.

What is claimed is:

1. A method of operating a touch-sensitive screen display of a device comprising:
    modulating a value of one or more display operating parameters of the device based at least in part on detecting touch events on the touch-sensitive screen, wherein the modulation comprises increasing or decreasing the value; and
    modulating the value of the one or more display operating parameters of the device opposite the touch-event detected modulation based at least in part on detecting an absence of touch events on the touch-sensitive screen;
    wherein the modulation of the display operating parameters occurs while the touch-sensitive screen display is displaying one or more images.

2. The method of claim 1, wherein the modulating one or more display operating parameters comprises modulating any of the following display operating parameters in any combination of two or more: a display frame rate; a display duty cycle; a set of pixels of the display held steady for two or more display frame cycles.

3. The method of claim 2, wherein, the modulating one or more display operating parameters comprises as the display frame rate increases, also increasing the display duty cycle.

4. The method of claim 3, and further comprising: retaining a sub array of pixels of the display for a particular frame image over two or more display frame cycles.

5. The method of claim 3, and further comprising: retaining a column and row of an array of pixels of the display for a particular frame image over two or more display frame cycles.

6. The method of claim 1, wherein the modulating one or more display operating parameters comprises at least decreasing the display rate based at least in part on the presence of detected touch events.

7. The method of claim 6, wherein the modulating one or more display operating parameters comprises increasing the display frame rate based at least in part on an absence of detected touch events.

8. The method of claim 2, wherein the detection of touch event comprises detecting capacitive touch sensing touch events.

9. The method of claim 8, wherein the modulating any combination of at least the following: a display frame rate; a display duty cycle; a set of pixels of the display held steady for two or more display frame cycles is to at least in part reduce potential electrical interference within the device.

10. A apparatus comprising:
    a device including a touch-sensitive screen display;
    said device being operative to modulate a value of one or more display operating parameters of the device to at least in part reduce potential electrical interference within the device based at least in part on touch events detected on the touch-sensitive screen, wherein the modulation comprises increasing or decreasing the value; and
    modulating the value of the one or more display operating parameters of the device opposite the touch-event detected modulation based at least in part on an absence of touch events detected on the touch-sensitive screen,
    wherein the modulation of the display operating parameters occurs while the touch-sensitive screen display is displaying one or more images.

11. The device of claim 10, wherein the device being further operative to modulate any of the following display operating parameters in any combination of two or more: a display frame rate; a display duty cycle; a set of pixels of the display held steady for two or more display frame cycles.

12. The device of claim 10, wherein the device being further operative to decrease the display frame rate based at least in part on detecting the presence of touch events on the touch-sensitive screen.

13. The device of claim 12, wherein the device being further operative to increase the display frame rate based at least in part on detecting the absence of touch events on the touch-sensitive screen.

14. The device of claim 13, wherein the device being further operative to also modulate a display duty cycle based at least in part on touch events detected on the touch-sensitive screen.

15. The device of claim 14, wherein the device being further operative to maintain pixel voltage signal value levels of a set of pixels for a particular frame image over two or more display frame cycles based at least in part on touch events detected on the touch-sensitive screen.

16. An apparatus comprising:

a device including a display, the display comprising means for detecting touch events on a touch-sensitive screen of the display;

the device further comprising means for modulating a value of one or more display operating parameters of the device based at least in part on detecting touch events on the touch-sensitive screen, wherein the modulation comprises increasing or decreasing the value; and modulating the value of the one or more display operating parameters of the device opposite the touch-event detected modulation based at least in part on detecting an absence of touch events on the touch-sensitive screen;

wherein the modulation of the display operating parameters occurs while the touch-sensitive screen display is displaying one or more images.

17. The apparatus of claim 16, wherein the means for modulating one or more display operating parameters of the device based at least in part on detecting touch events on the touch-sensitive screen comprises means modulating any of the following display operating parameters in any combination of two or more: a display frame rate; a display duty cycle; a set of pixels of the display held steady for two or more display frame cycles.

18. The device of claim 16, wherein the means for modulating one or more display operating parameters of the device based at least in part on detecting touch events on the touch-sensitive screen comprises means for decreasing the display frame rate based at least in part on detecting the presence of touch events on the touch-sensitive screen.

19. The device of claim 18, wherein the means for modulating one or more display operating parameters of the device based at least in part on detecting touch events on the touch-sensitive screen comprises means for increasing the display frame rate based at least in part on detecting the absence of touch events on the touch-sensitive screen.

* * * * *